J. W. CLARK.
Manure Fork.
No. 102,092.
Patented April 19, 1870.
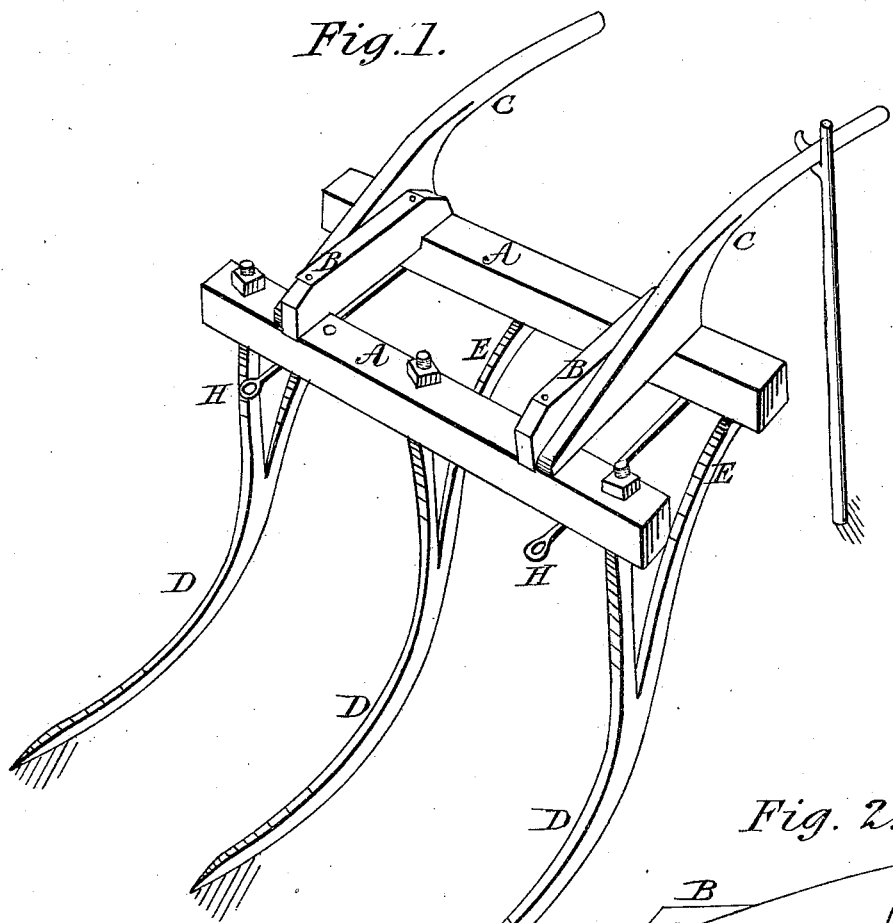
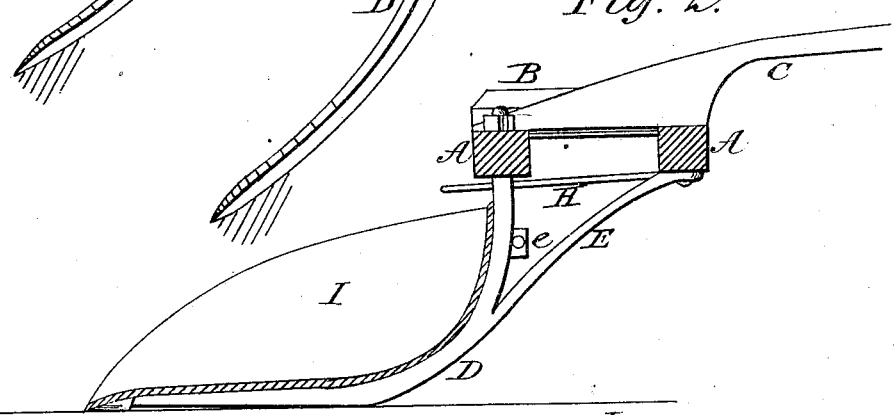
Witnesses:
L. Hauler
Phil. T. Dodge
Inventor:
J. W. Clark
by Dodge & Munn
his attys

United States Patent Office.

JOHN W. CLARKE, OF KINGSTON, WISCONSIN.

Letters Patent No. 102,092, dated April 19, 1870.

IMPROVEMENT IN COMBINED MANURE-FORK AND SCRAPER.

The Schedule referred to in these Letters Patent and making part of the same

*To all whom it may concern:*

Be it known that I, JOHN W. CLARKE, of Kingston, in the county of Green Lake and State of Wisconsin, have invented certain new and useful Improvements in Horse Manure-Forks; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention I will proceed to describe it.

My invention consists in the novel construction of an implement for moving manure and similar products on a farm, as hereinafter more fully explained.

In the drawings—

Figure 1 is a perspective view of the implement; and

Figure 2 is a longitudinal vertical section of the same, with a scraper attached.

To construct my improved implement I first form a series, three or more, large strong tines, D, of the form shown in the drawing, and of any lengths desired, equal or unequal, each of them having a strong arm, E, projecting from its rear side, to form a brace, as shown more clearly in fig. 2.

These tines thus made are firmly attached to a frame, consisting of two bars, A, connected by cross-bars B and handles C, the front or main portion of the tines having their rear ends pass up through the front bar A, where they are secured by nuts, the rear ends of the braces E being firmly secured to the rear bar A in any suitable manner.

A couple of draft-rods, H, are secured to the bars A, and have eyes formed in their front ends to attach the draft-chain to.

With an implement thus constructed, the farmer can attach his team, and with it gather up the manure, straw, and litter of the barn-yard into heaps, preparatory to loading it onto wagons or other vehicles, or he can at once convey it to the field by hauling the fork with its load to the field, and there detaching it from the load.

For the purpose of conveniently using the implement for removing or scraping up fine manure, and also of using it in place of the ordinary scraper in removing earth, I make a scraper, I, of the ordinary form, and, at the front, on the under side, secure loops or caps, $a$, into which the points of the tines can be inserted, there being also lugs, $e$, on the rear of the upper part, so arranged as to pass on each side of the outer tines, a pin or bolt being inserted through the lugs behind the tines, as represented in fig. 2, by which means the scraper I can be secured permanently to the fork, as there represented.

When thus arranged, the implement can be used for scraping up manure or earth, or for any similar purpose.

It is, however, principally as a fork that the implement is intended for use, and with it the farmer is enabled to handle all coarse manure, litter, straw, stalks, hay, &c., with a team, even more readily than hay is now handled with horse hay-forks.

Having thus described my invention,

What I claim, is—

1. The manure-fork consisting of the curved tines D, with the braces E attached to the frame A and having the handles C attached, substantially as described.

2. The scraper I, in combination with a horse manure-fork, substantially as set forth.

J. W. CLARKE.

Witnesses:
T. B. FAIRCHILD,
N. SEELY.